(12) United States Patent
Wen

(10) Patent No.: US 6,757,387 B2
(45) Date of Patent: Jun. 29, 2004

(54) SUPPLEMENTARY HAND FREE TRANSCEIVER OF A FIXING NETWORK WIRED TELEPHONE

(75) Inventor: Yung Chuan Wen, Xin-Dian (TW)

(73) Assignee: Far Reaching Co., Ltd., Taipei (TW)

( * ) Notice: Subject to any disclaimer, the term of this patent is extended or adjusted under 35 U.S.C. 154(b) by 478 days.

(21) Appl. No.: 09/929,010

(22) Filed: Aug. 15, 2001

(65) Prior Publication Data
US 2003/0035536 A1 Feb. 20, 2003

(51) Int. Cl.[7] ................................................ H04M 1/00
(52) U.S. Cl. .............................. 379/420.04; 379/428.02
(58) Field of Search ....................... 379/420.04, 428.02, 379/430; 455/575.2

(56) References Cited

U.S. PATENT DOCUMENTS 6,683,952 B1 * 1/2004 Bernardi et al. ............ 379/447

* cited by examiner

Primary Examiner—Jack Chiang
(74) Attorney, Agent, or Firm—Troxell Law Office PLLC

(57) ABSTRACT

A supplementary hand free transceiver of a fixing network wired telephone installed to a wired telephone for providing to a non-built-in, non-amplified hand free transceiver is disclosed. The present invention has a hand free transceiver formed by a circuit box suitable for various telephones. No extension line is required and no original function is necessary to be changed. The original telephone can be added with a hand free function (no audio amplifying). Therefore, in using the telephone, the user's hands may operate freely. Furthermore, the receiver is not clamped in the neck portion so that the user may operate a telephone conveniently.

1 Claim, 2 Drawing Sheets

SUPPLEMENTARY HAND FREE TRANSCEIVER OF A FIXING NETWORK WIRED TELEPHONE

BACKGROUND OF THE INVENTION

1. Field of the Invention

The present invention relates to a telephone communication, and particularly to a supplementary hand free transceiver of a fixing network wired telephone installed to a wired telephone for providing to a non-built-in, non-amplified hand free transceiver.

2. Description of Related Art

In general, in a fixing network wire phone, if the user wants to receive a call in a hand free way, a built-in amplified telephone is used. However, this type of telephone will generate a large feedback and a high frequency echo noise is received by the telephone. Therefore, most of the users can not accept this product. Another, a head wearing or an ear hanging transceiver may be an ideal device, but most of telephones are not installed with these devices. If it is desired to add these devices, the cost is high and some labors are required. Especially for the later function, the user may add a telephone with hand free function.

SUMMARY OF THE INVENTION

Accordingly, the primary object of the present invention is to provide a supplementary hand free transceiver of a fixing network wired telephone installed to a wired telephone for providing to a non-built-in, non-amplified hand free transceiver. The present invention has a hand free transceiver formed by a circuit box suitable for various telephones. No extension line is required and no original function is necessary to be changed. The original telephone can be added with a hand free function (no audio amplifying). Therefore, in using the telephone, the user's hands may operate freely. Furthermore, the receiver is not clamped in the neck portion so that the user may operate a telephone conveniently.

The various objects and advantages of the present invention will be more readily understood from the following detailed description when read in conjunction with the appended drawing.

DETAILED DESCRIPTION OF THE PREFERRED EMBODIMENTS

Figure 1:
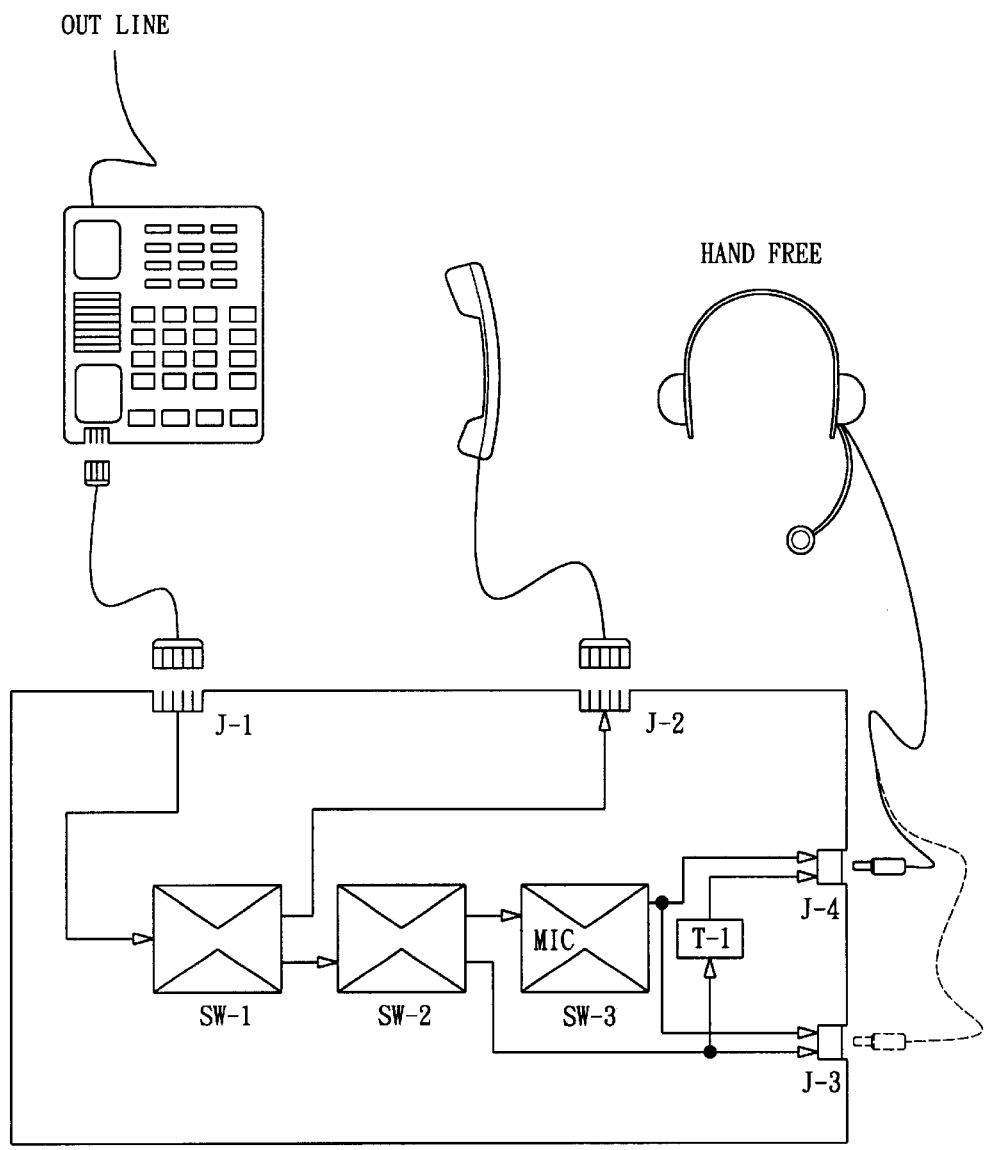
FIG. 1 is a block diagram showing the operation principle of the present invention.
Figure 2:
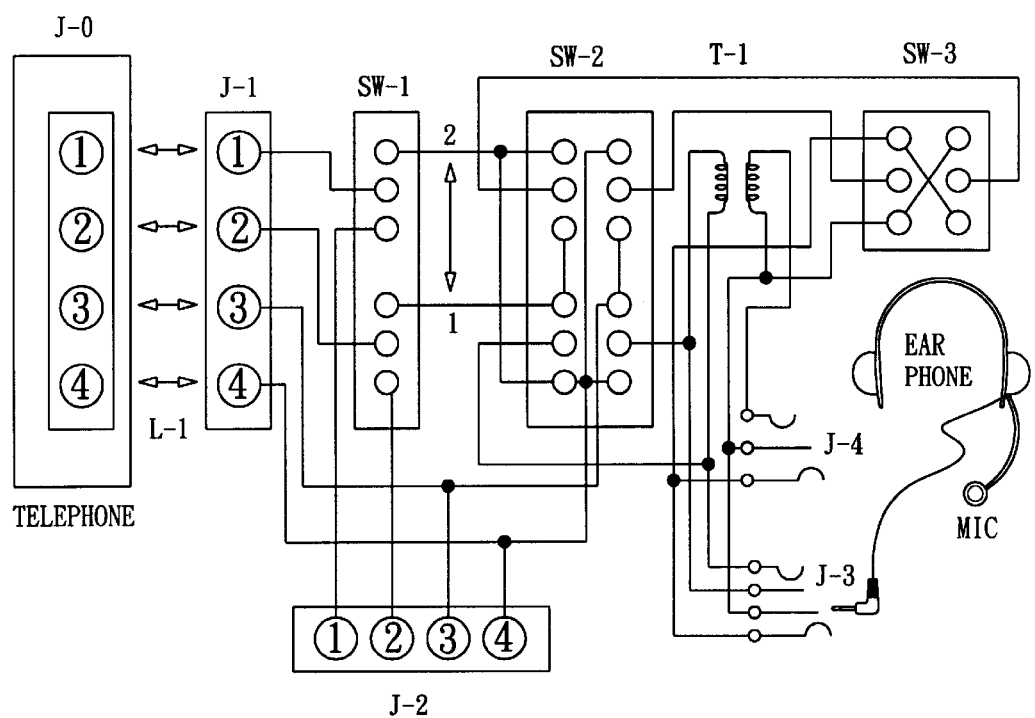
FIG. 2 is a circuit diagram showing one embodiment of the present invention.

As shown in the figures, the circuit adapter box of the present invention has transceiver receptacle J-1 which is connected to a telephone transceiver receptacle J-0 through connecting wires L-1. The original telephone transceiver receptacle must be taken out in advance and then the receptacle J-2 for retaining the original transceiver function of the circuit converting box of the present invention is inserted. When switch SW-1 for hand holding or hand free of the circuit converting box is placed in the hand holding position 1. The telephone transceiver receptacle J-0 is connected to the transceiver receptacle J-1 through the connecting wire L-1, then the path is connected to J-2 through the switch SW-1 so as to complete the hand holding function of the telephone. When the switch SW-2 is placed in a hand free function position 2, the telephone holding function disappears and then it is switched to the hand free function.

Since the arrangement of general wired telephone hand holding connecting wires are different with the manufacturers, for example a type of 1-4 transmitter and 2-3 receiver, or a type of 1-4 receiver and 2-3 receiver. Therefore, the connecting wires of the receiver and transmitter are arranged to a single preset arrangement through a switch SW-2 of the circuit converting box of the present invention. Therefore, as the receiver and transmitter of the present invention are connected incorrectly; the switch SW-3 serves to conform a preset polarity arrangement of the speaker of a microphone, wherein the original positive polarity and negative polarity may be arranged informally. The circuit of the transceiver through the switch SW-2 and switch SW-3 is connected to J-3, and then the transceiver, such as a head wearing type transceiver or earphones are inserted into J-3. The hand free function of the present invention is accomplished.

J-3 is a receptacle with four joints which are not grounded in common. Therefore, in the hand free transceiver, a plug of four joints which are not grounded in common must be used. However, commercially, plugs of three joints which are not grounded in common are sold in generally. To be compatible with that used in the present invention, in the present invention, an audio transformer T-1 is added between the switch SW-2 and J-3, then the type of four joints is changed into the type of three joints, as shown in the figures, the J-4 or J-3 and J-4 are place in the circuit converting box of the present invention.

In above description, it is known that switch SW-2 is used to switch the arrangement of the connecting wires of the transceiver and switch SW-3 is used to correct the arrangement of the polarities of the speaker in a microphone. After the present invention is mounted, the switch SW-2 can be placed in position 2, and the transceiver of the original telephone is moved to be beside the receiver. Now, the switch of the transceiver in the telephone is placed in a lesson condition. As the user moves the switch SW-2 to the hand free function position so that a silent voice emits, then a correct position is acquired. Then the speaker of the microphone is knocked by a finger or a pen. Then the switch SW-3 is positioned to a position that the knocking voice is heard, thus, a correct position is acquired, or by dialing a calling, the speaker is adjusted by communication. If the switch SW-2 and switch SW-3 are positioned in a correct position, these two switches are fixed by sticky strip or other ways without being adjusted further. After above installing and adjusting function is accomplished, the user may place switch SW-1 to position 1, i.e., the hand holding function of the telephone. If it is placed in the position 2, then it is in a hand free function. Thus the user may communicate easily and comfortably. The two hands of the user may do any thing as desired.

The present invention is provided for adding with a fixed network wired telephone and a hand free function is added. It can be installed and operated easily. The original telephone is unnecessary to be updated, and further the functions of the original telephone can be retained.

It should be noted that in the present invention, a hand free function is added to an original hand free transceiver, which is different from that used in the prior built-in hand free transceiver. In the prior art, the three wire type of telephone is not compatible with the four wired telephone main frames having extension lines. The present invention is suitable to any receiver.

The present invention are thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A supplementary hand free transceiver of a fixing network wired telephone installed to a wired telephone for being utilized in a non-built-in, non-amplified hand free transceiver, comprising:

a circuit converting box suitable for various types of transceivers of wired telephones;

connecting wires for the circuit converting box; and a head wearing or ear hanging hand-free transceivers;

wherein the circuit converting box of the transceiver includes an input receptacle J-1 connected to an original hand holding transceiver receptacle, connecting wires L-1, a receptacle J-2 for retaining functions of the original hand holding receiver; a hand holding or hand free switch SW-1, a switch SW-2 for forming a predetermined arrangement from various arrangement; a switch SW-3 for forming a predetermined positive and negative polarity connection of a speaker of a microphone from various different positive and negative polarity connections, a transceiver receptacle J-3 with four joints which are not grounded in common; a transceiver receptacle J-4 with three joints which are grounded in common; an audio matching transformer T-1 for converting a structure of four joints not being grounded in common into a structure of three joints being grounded in common; and J-1 is connected to an original transceiver receptacle J-0 through the connecting wires L-1, then J-1 is connected to switch SW-1, then the hand holding wire connection of the switch SW-1 is connected to J-2; then the original transceiver receptacle is inserted into the J-2; then the switch SW-1 is placed in the hand hold position, thereby, a hand hold function of the original telephone is complete; the hand free transceiver joint point of switch SW-1 is connected to switch SW-2 and switch SW-3 so that the connecting wires and polarities are reordered to a predetermined order; then the connection connected to J-3, T-1 and J-4 are installed for a structure of three joints being grounded in common; a hand free receptacle is inserted into J-3 or J-4, and then switch SW-1 is placed in a hand free position; as a result, a hand free function of the present invention is completed.

* * * * *